(12) United States Patent
Fulton et al.

(10) Patent No.: US 8,321,851 B2
(45) Date of Patent: Nov. 27, 2012

(54) DETERMINING COMPILER EFFICIENCY

(75) Inventors: Mike Stephen Fulton, British Columbia (CA); Ajith Ramanath, Bangalore (IN); Radhakrishnan Thangamuthu, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 12/644,809

(22) Filed: Dec. 22, 2009

(65) Prior Publication Data
US 2011/0154304 A1    Jun. 23, 2011

(51) Int. Cl.
*G06F 9/45* (2006.01)
(52) U.S. Cl. .................................. 717/151; 717/140
(58) Field of Classification Search ............... 717/100, 717/140–161
See application file for complete search history.

(56) References Cited

U.S. PATENT DOCUMENTS

| | | | |
|---|---|---|---|
| 6,078,744 A | 6/2000 | Wolczko et al. | |
| 6,118,940 A | 9/2000 | Alexander et al. | |
| 6,381,558 B1 | 4/2002 | Berry et al. | |
| 6,427,234 B1 | 7/2002 | Chambers et al. | |
| 2004/0143825 A1* | 7/2004 | Hicks ........................ | 717/148 |
| 2009/0064109 A1 | 3/2009 | Mitran et al. | |
| 2009/0178032 A1 | 7/2009 | Yang et al. | |

OTHER PUBLICATIONS

Bassman et al., "Evaluating the Performance Efficiency of Ada® Compilers," 1985, ACM, p. 179-194.*
Breech, Ben etal. "Rugrat: Runtime Test Case Generation Using Dynamic Compilers", IEEE Xplore,1071-9458/08, 2008 IEEE.
Zelenov, Sergey et al. "Model-Based Testing of Optimizing Compilers", TestCom/FATES 2007, LNCS 4581, IFIP—International Federation for Information Processing 2007.
Igor Veresov "Probabilistic Approach to JIT Compilers Testing", Research Disclosure, 455, May 2006.
Kossatchev, A. S. et al. "Survey of Compiler Testing Methods", Programming and Computing Software, vol. 31, Issue 1, 2005, ISSN:0361-7688, Abstract.
Bazzichi, Franco, et al. "An Automatic Generator for Compiler Testing", IEEE Transactions on Software Engineering, vol. SE-8m No. 4, Jul. 1982.

* cited by examiner

*Primary Examiner* — Anna Deng
*Assistant Examiner* — Qing Chen

(57) ABSTRACT

There is provided a computer implemented method for determining the efficiency of a runtime compiler. A set of execution times representing the time taken for program code to perform a set task after two or more runtime compilations is recorded. A first metric as the difference between the first execution time and the last execution time of the set of execution times, a second metric as the average throughput improvement from the set of execution times, and a third metric as the time taken for the compiler to achieve the maximum throughput from the set of execution times is calculated. Finally, an efficiency metric is calculated using the first, second and third metrics to determine the efficiency of the compiler.

16 Claims, 13 Drawing Sheets

DETERMINING COMPILER EFFICIENCY

REFERENCE TO A COMPUTER PROGRAM LISTING

Appendices 1-3, attached, are referenced below and include computer program listings herein incorporated by reference.

FIELD OF THE INVENTION AND BACKGROUND

The invention or inventions relate generally to methods and systems of runtime compilers that optimise the throughput of program code execution. More specifically, the invention relates to methods and systems of determining the efficiency of compilers.

SUMMARY

A computer implemented method for determining the efficiency of a runtime compiler is described. A set of execution times representing the time taken for program code to perform a set task after two or more runtime compilations is recorded. A first metric as the difference between the first execution time and the last execution time of the set of execution times, a second metric as the average throughput improvement from the set of execution times, and a third metric as the time taken for the compiler to achieve the maximum throughput from the set of execution times is calculated. Finally, an efficiency metric is calculated using the first, second and third metrics to determine the efficiency of the compiler.

Also a system for determining the efficiency of a runtime compiler comprising a processor and a storage device is described. A set of execution times representing the time taken for program code to perform a set task after two or more runtime compilations is recorded in the storage device. A first metric as the difference between the first execution time and the last execution time of the set of execution times, a second metric as the average throughput improvement from the set of execution times, and a third metric as the time taken for the compiler to achieve the maximum throughput from the set of execution times is calculated by the processor. Finally, an efficiency metric is calculated by the processor using the first, second and third metrics to determine the efficiency of the compiler.

DRAWINGS

Embodiments of the present invention will now be described with reference to the drawings and appendices, in which.

DETAILED DESCRIPTION

Figure 1:
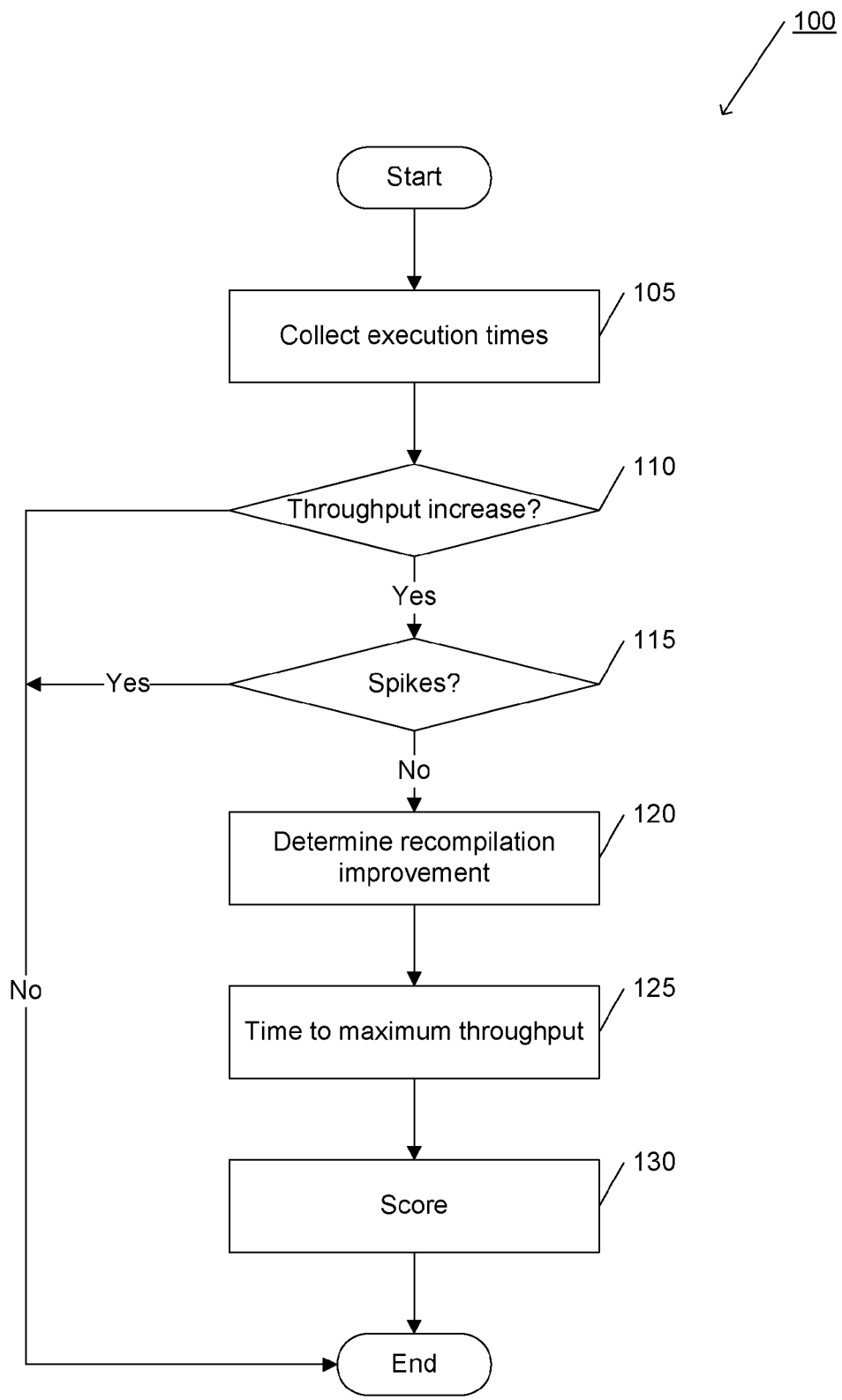
FIG. 1 shows a method for determining the efficiency of a compiler according to an embodiment of the invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, or communicate the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 shows a method 100 for determining the efficiency of a compiler. Method 100 starts at step 105 where the time taken for an application to perform a set task is recorded for several runtime recompilation iterations.

Figure 2:
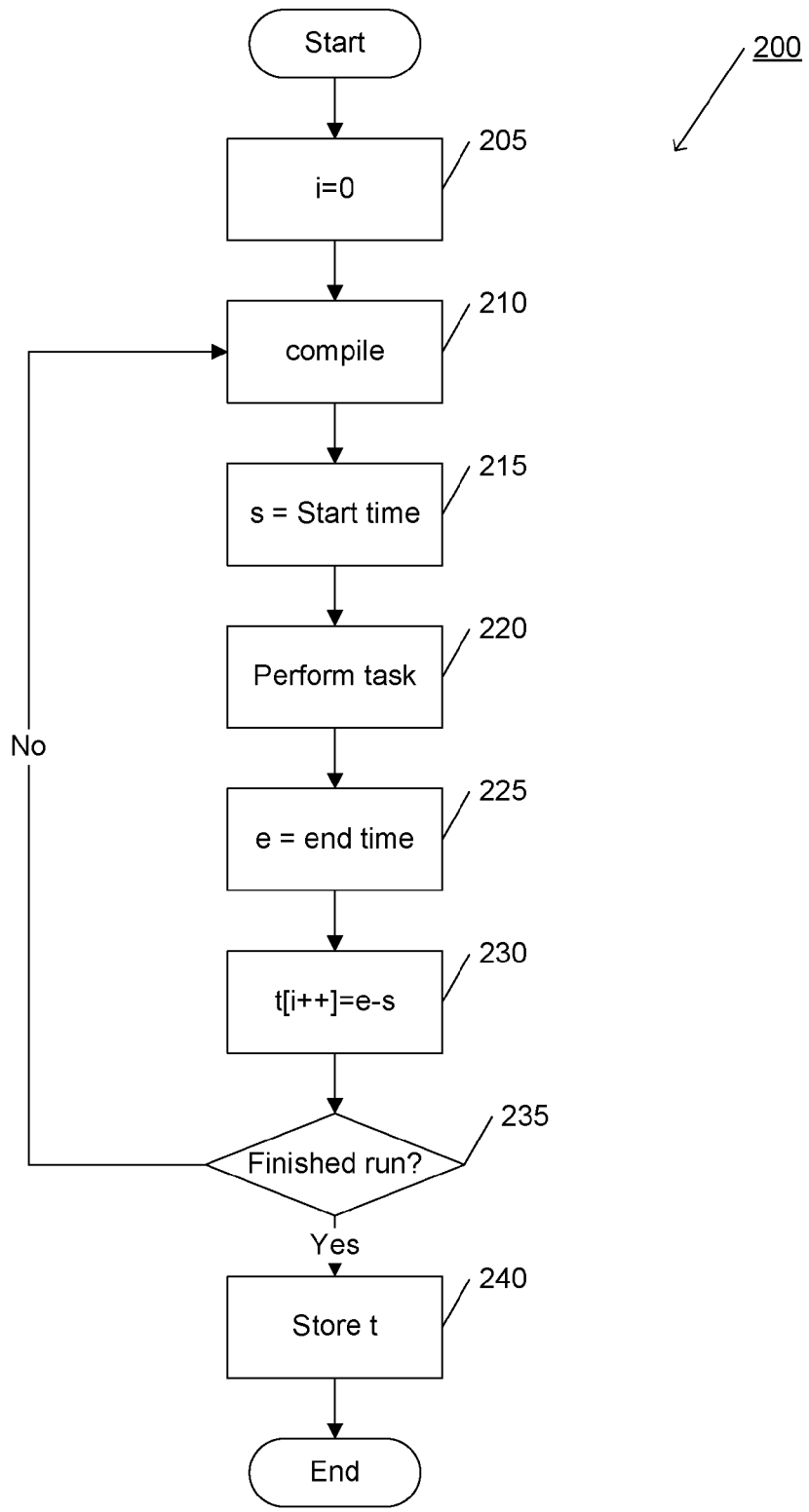
FIG. 2 shows a method for recording the time taken for an application to perform a set task for several runtime recompilation iterations according to an embodiment of the invention.

FIG. 2 shows a method 200 for recording the time taken for an application to perform a set task for several runtime recompilation iterations. The method 200 starts at step 205 where a counter is set to zero. At step 210 the runtime compilation of program code is performed. It should be noted however, that the runtime compilation need not exist as a discreet step 210 and may occur during steps 215, 220, 225, and 230.

At step 215 a start timestamp is recorded. At step 220 the compiled code performs a set task. Once the task is completed, an end timestamp is recorded at step 225. At step 230 the difference between the start and the end timestamp are stored in an array.

At step 235, if the number of compile runs has not been completed, the method 200 reverts back to step 210 where the machine code is compiled again. If the number of compile iterations is sufficient, the method 200 progresses to step 240 where the array recording the time taken to perform a set task is stored.

Execution times for a compiler are given in Table 1 below.

TABLE 1

| Runtime compile iterations | Execution time (ms) |
|---|---|
| 1 | 250 |
| 2 | 240 |
| 3 | 180 |
| 4 | 190 |
| 5 | 160 |
| 6 | 160 |
| 7 | 200 |
| 8 | 90 |
| 9 | 60 |
| 10 | 40 |

At step 110 of method 100, the total throughput improvement of the compiler is calculated. Typically, a runtime compiler should exhibit improvements in throughput and therefore the execution time for performing a set task should decrease according to runtime compilations. One such method to determine if a compiler strategy results in a throughput improvement is to compare the execution time of the first runtime compilation to the last runtime compilation.

Figure 3:
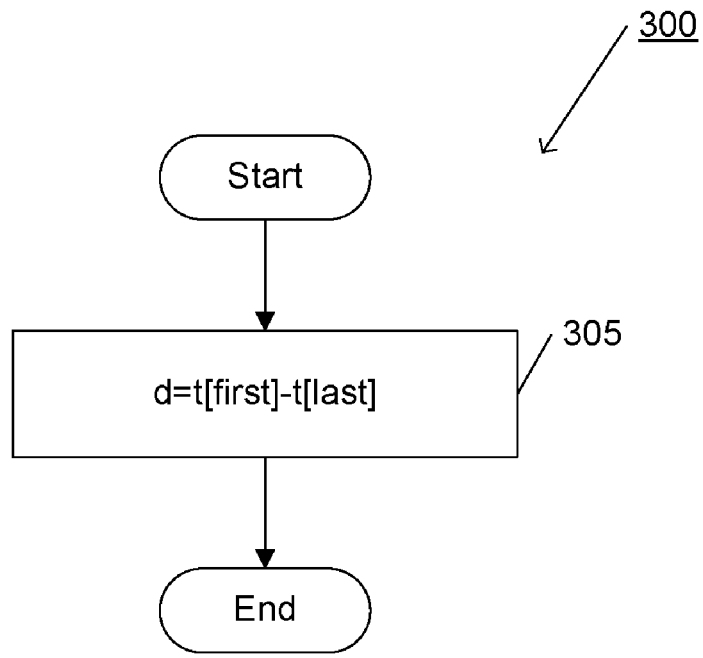
FIG. 3 shows a method for calculating the total throughput improvement of a compiler according to an embodiment of the invention.

FIG. 3 shows a method 300 for calculating the total throughput improvement of a compiler. At step 305 of method 300, the difference between the first execution time and the last execution time is calculated.

Accordingly, an appropriate compiler strategy would result in a positive difference between the first execution time and the last execution time. Conversely, if the compiler strategy is defective, there would be a negative difference between the first execution time and the last execution time.

At step 110 of method 100, if the difference between the first execution time and the last execution time is determined to be negative, indicating the lack of a throughput improvement, the method 100 terminates. Conversely, if the difference between the first execution time and the last execution time is determined to be positive, indicating an improvement of throughput, the method 100 continues to step 115.

At step 115 of method 100, increases in execution time are identified and classified.

Figure 4:
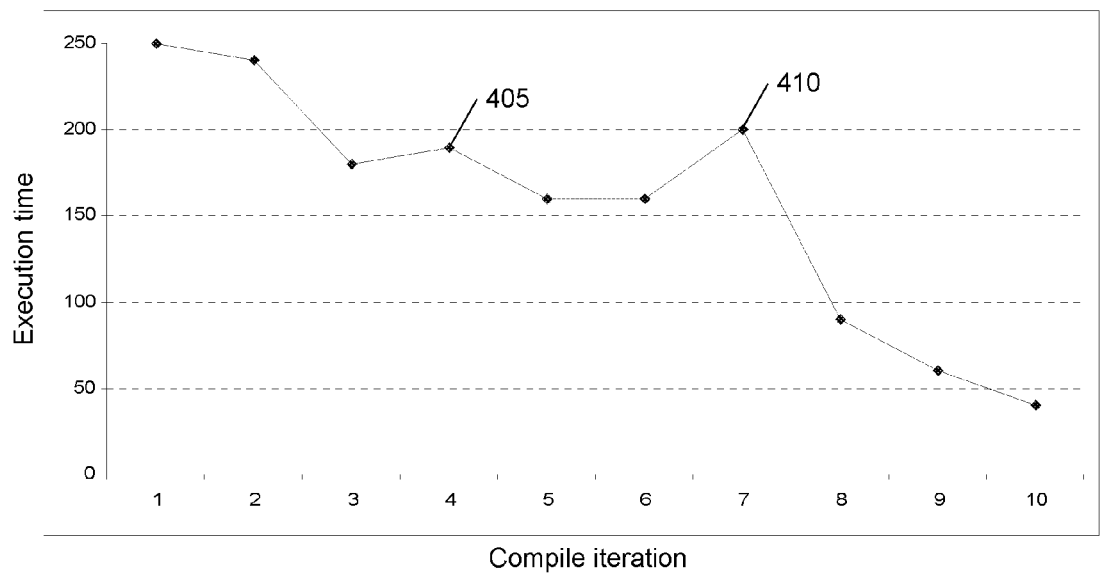
FIG. 4 shows a graphical representation of the execution times according to an embodiment of the invention.

FIG. 4 shows a graphical representation of the execution times of Table 1 above. Typically, after each runtime compilation iteration, the execution time should decrease. Sometimes however, a compiler strategy may increase the time taken to perform a task and as a result a 'spike' in the execution times may be seen. For example, FIG. 4 shows two execution time spikes 405 and 410.

Execution time spikes may be classified into whether the spike is acceptable or not. For example, is a compiler strategy results in only a small execution time spike 405, the compiler strategy may be deemed to be acceptable. However, if a compiler strategy results in a large execution time spike 410, the compiler strategy may be deemed to be unacceptable.

Figure 5:
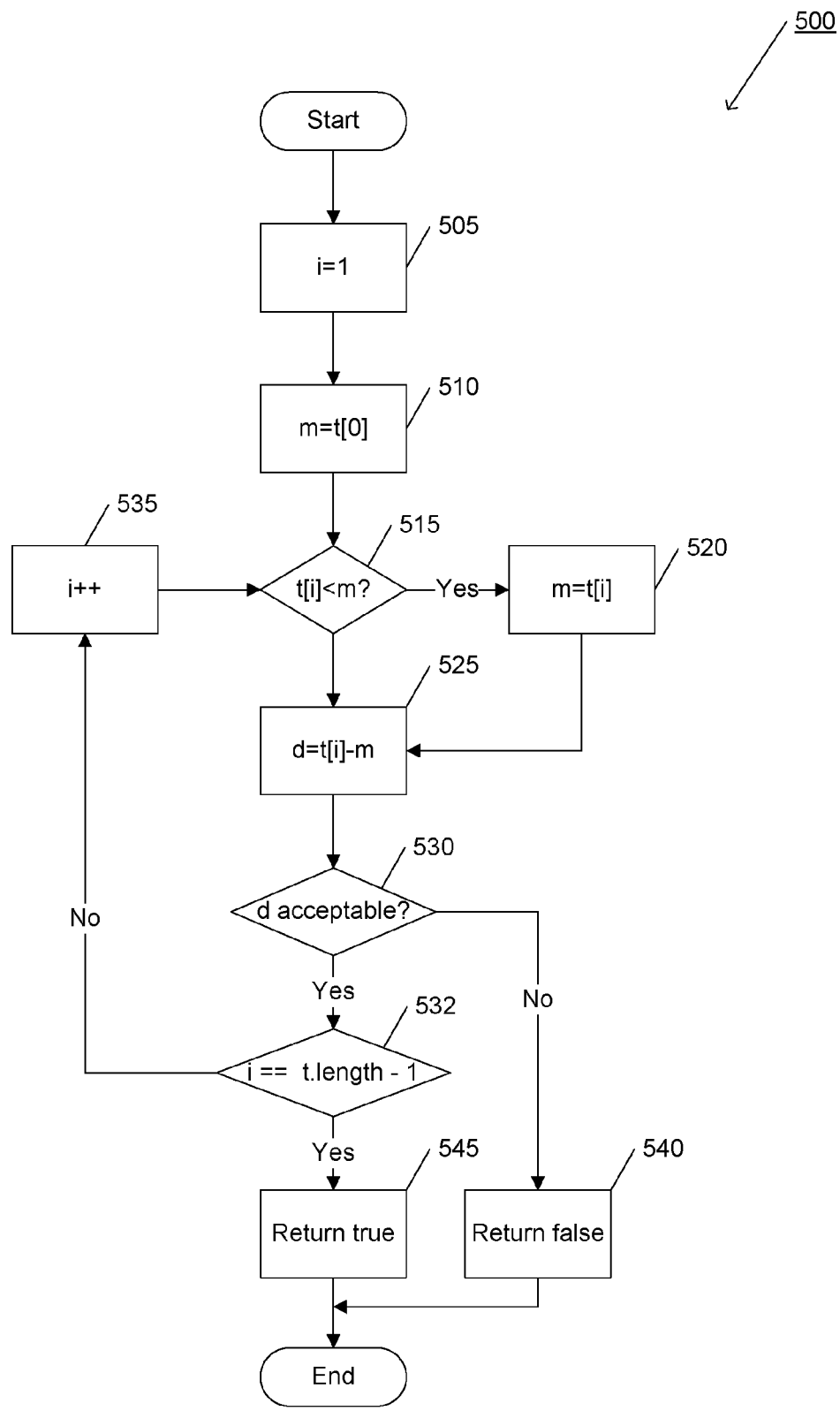
FIG. 5 shows a method for detecting unacceptable execution time spikes for successive compile iterations according to an embodiment of the invention.

FIG. 5 shows a method 500 for detecting unacceptable execution time spikes for successive compile iterations. Method 500 uses the execution times for successive compile iterations that were stored in step 240 of method 200.

Method 500 begins at step 505 where a counter is set to one. At step 510 a variable representing the current minimum execution time is set to the first variable of the execution time array.

At step 515, if the current execution time is less than the current minimum execution time, the current minimum execution time is set to the current execution time at step 520. At step 525 the difference between the current execution time and the minimum execution time is calculated. If the difference is positive, it indicates that a spike in the execution time has occurred.

At step 530 it is determined if the difference is acceptable. In order to determine whether the difference in execution time is caused by timing APIs, the increases in execution time may be compared to the latency of the timing APIs. For example, a spike in the execution time can either be caused by latency in timing APIs such as the getTimeOfDay( ) API used to retrieve the current time or problems with underlying runtime compiler.

As such, if the increase in execution time is less than or equal to the latency of the timing APIs, it can be concluded that the increase in the execution time is caused by the timing API latency. Conversely, if the increase in execution time is larger than the latency of the timing APIs, then the increase in the execution time may be attributed to a defect in the runtime compiler. Benchmarking tests are typically run in well configured test conditions so that no other threads/processes such as the garbage collector can cause interference.

Pseudo code for method 500 for detecting unacceptable execution time spikes for successive compile iterations is given in Appendix 1.

Figure 6:
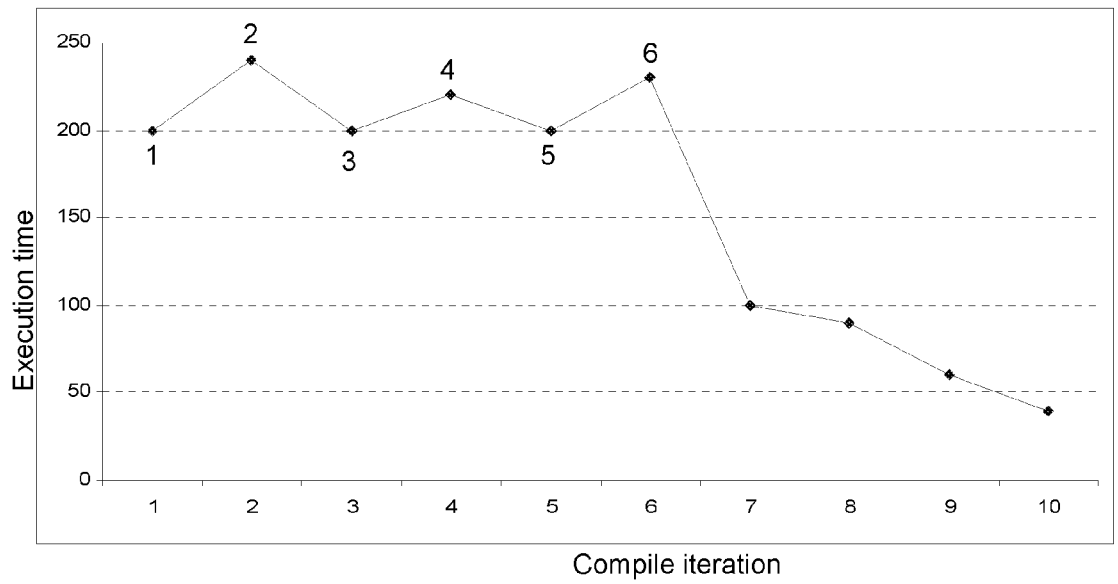
FIG. 6 shows a graphical representation of the execution times according to an embodiment of the invention.

To determine whether a difference in execution time is acceptable or not, the difference may be compared to percentage specified by a user. For example, pseudo code determining whether a spike in execution time is acceptable is given in Appendix 2. By way of illustration, the execution times given in FIG. 6 are considered below with respect to the pseudo code with the user input considered as 50 in which:

1. Iteration 1 is set as minimumPeak.
2. Iteration 2 is compared with the minimumPeak. Since the execution time of iteration 2 is more than the minimumPeak, deltaFromMinimumPeak is set to the difference, 40.
3. Since the acceptable deviation is 50, a delta of 40 is considered OK and the next iteration is considered.
4. For iteration 3, minimumPeak and execution time of iteration 2 are both 200. As there is no improvement of performance, there is no need to reset the minimumPeak to a newer value.
5. The remaining iterations are then considered in the same manner.
6. Finally, the compiler strategy is determined to be acceptable as the difference between minimumPeak and execution times for all of the iterations is less than the acceptable spike value.

If the difference is acceptable, the method 500 continues to step 532 where the counter is incremented if there are further execution times to consider and the process is repeated for all values of the execution time array. If there are no further execution times to consider, the method 500 returns true at step 545 and then the method 500 terminates.

However, if the difference is not acceptable, the method 500 returns false at step 540 and the method 500 then terminates.

At step 115 of method 100, method 500 is performed to detect and classify spikes in execution time. If any of spikes in execution time are determined not to be acceptable such that method 500 returns false, method 100 terminates. However, if there are not spikes in the execution times, or any spikes in execution time are acceptable, the method 100 progresses to step 120.

At step 120 of method 100, the average improvement in the execution times after runtime recompilations at higher optimisations is calculated. Typically, runtimes record the number of times a method is called in an application. If a method is called frequently, the runtime may compile the program code of the method at a higher optimization level so as to reduce the execution time.

Figure 7:
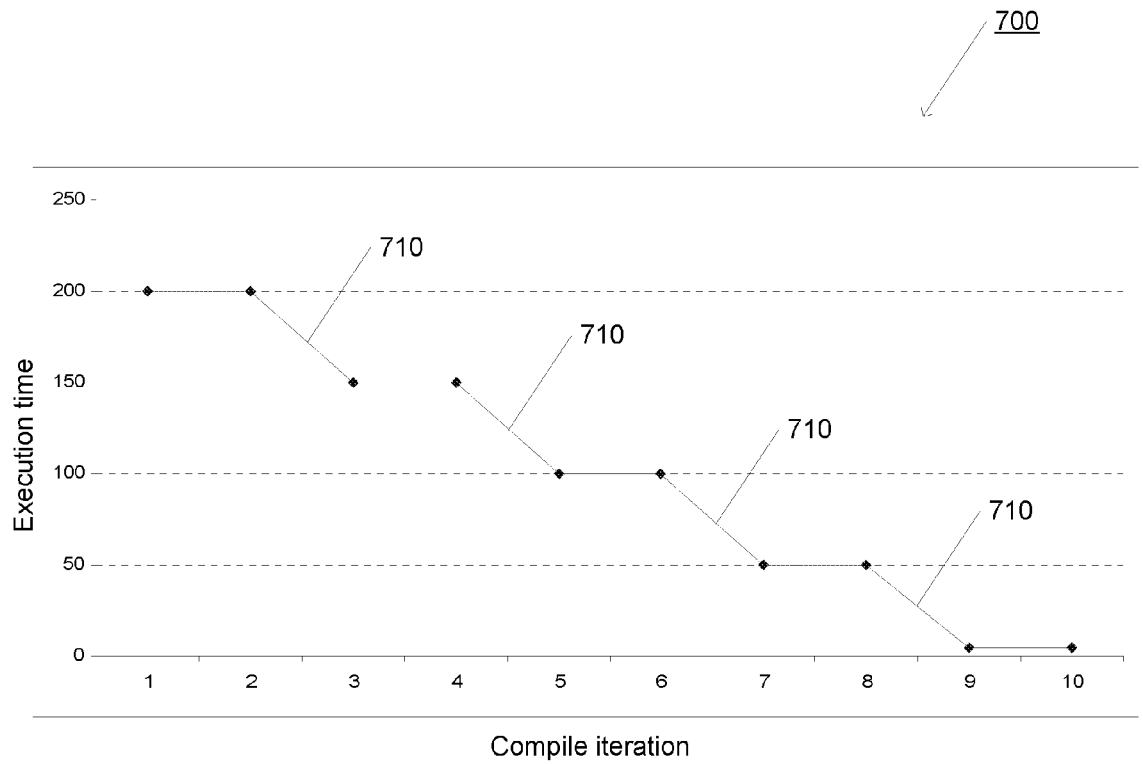
FIG. 7 shows the effect of higher levels of optimization of a compilation compared to the execution time of the task according to an embodiment of the invention.

For example, FIG. 7 shows the effect of higher levels of optimization of a compilation compared to the execution time of the task. The compile iterations are shown on the X axis and the execution time in seconds is shown on the Y axis. Typically, the application of a higher level of optimization will show a significant drop in execution times of the task. The iterations where the application was compiled at an increased level of optimisation are indicated at 710 and are characterised by a relatively large drop in execution time.

Appendix 3 shows the pseudo code to identify the compilation iterations where a higher level of optimization was used and to compute the average reduction in execution times attributable to the higher levels of optimisation.

Figure 8:
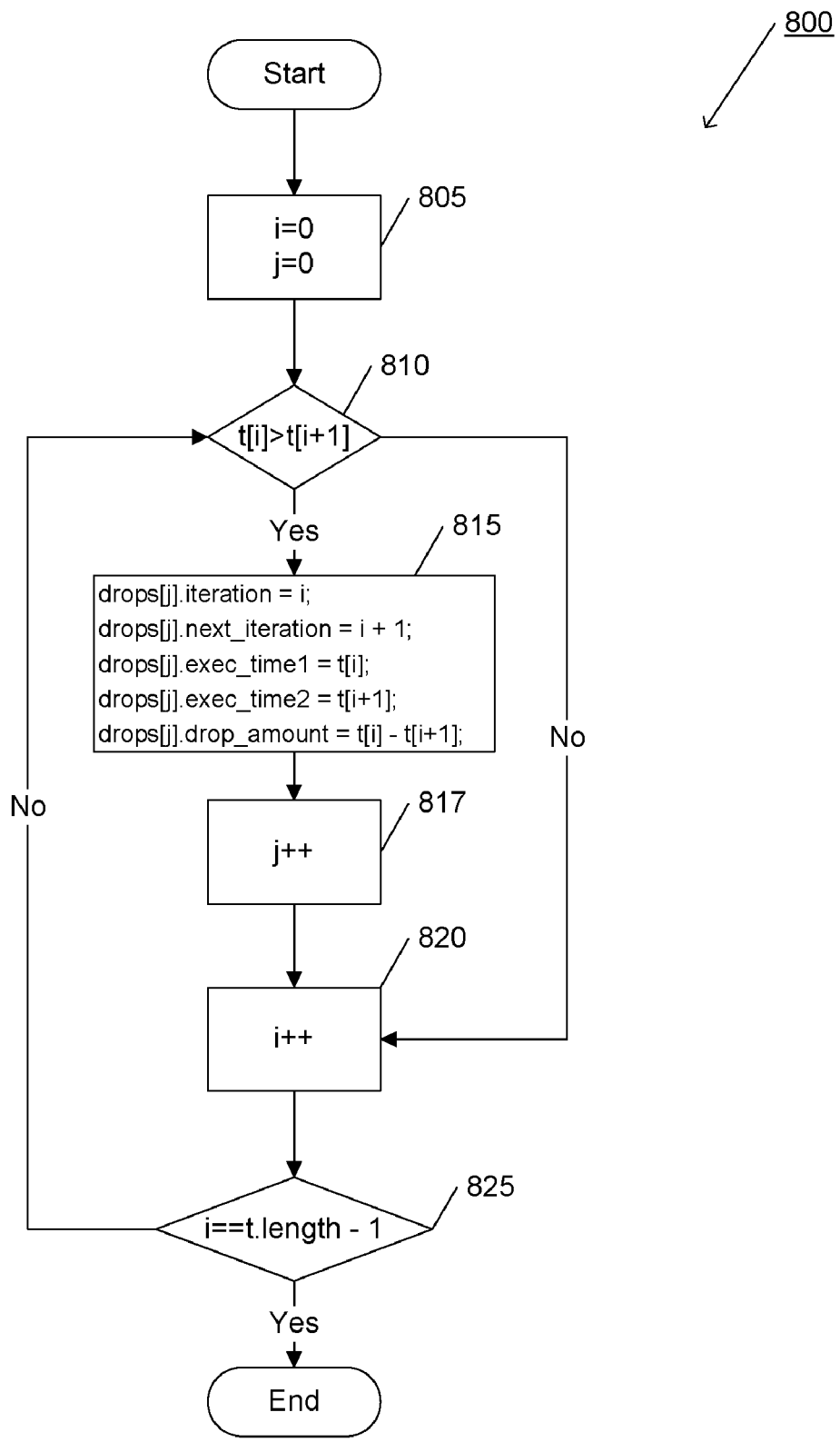
FIG. 8 shows the steps of the method for identifying drops in execution time according to an embodiment of the invention.

FIG. 8 shows the steps of the method 800 for identifying drops in execution time. The method 800 starts at step 805 where a first and a second counters are set to zero. At step 810, if the execution time is larger than the following execution time, the method 800 progresses to step 815 where a drop in execution time is recorded and then at step 817 the second counter is incremented. Conversely, if the execution time is smaller than the following execution time, the method 800 progresses to step 820 where the first counter is incremented. At step 825, if all of the execution times in the execution time array have been considered, the method terminates, or otherwise reverts back to step 810.

Figure 9:
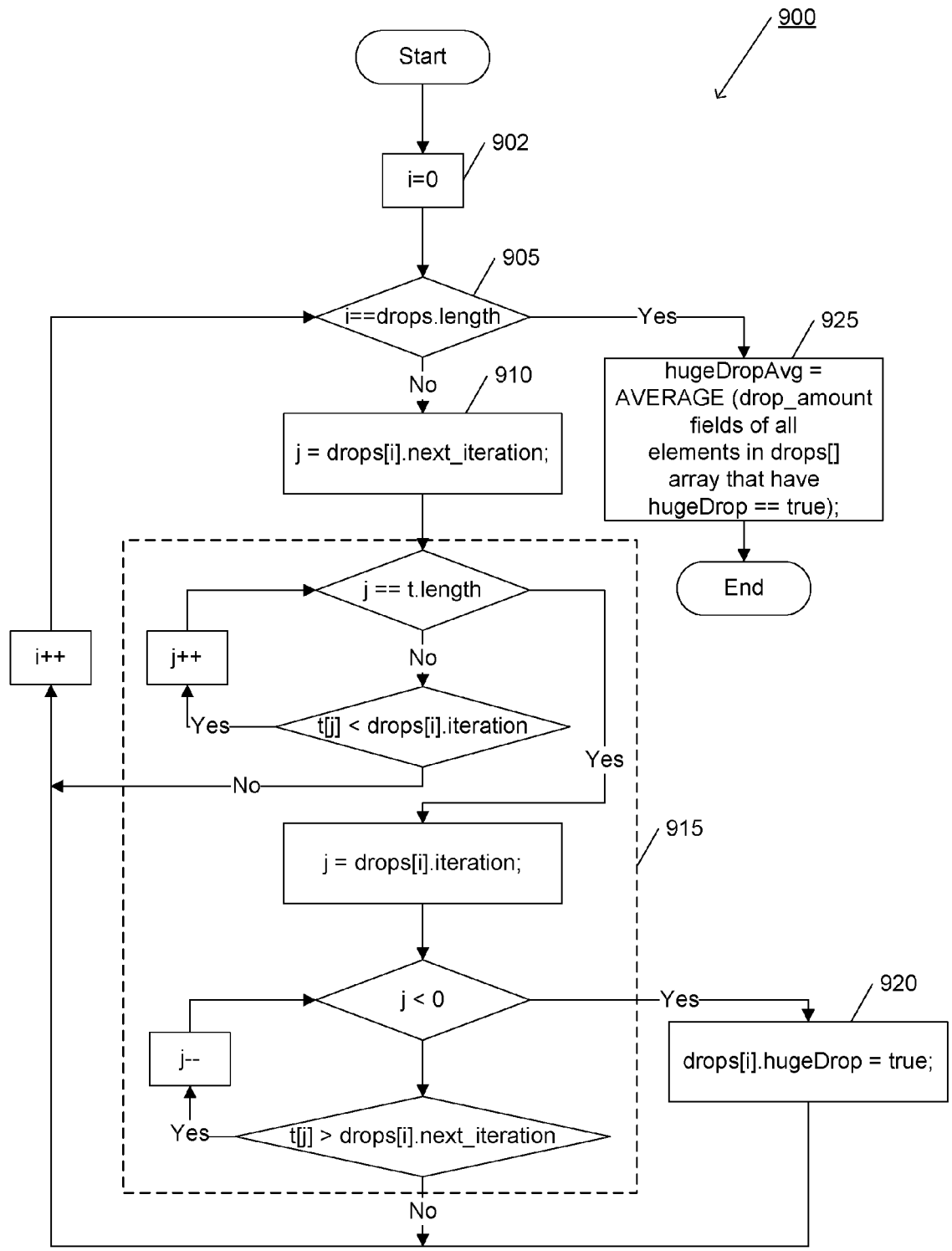
FIG. 9 shows a method for identifying significant drops in execution times and for calculating the average of the significant drops in the execution times according to an embodiment of the invention.

FIG. 9 shows a method 900 for identifying significant drops in execution times and for calculating the average of the significant drops in the execution times.

The method 900 starts at step 902 where a first counter is set to zero. At step 905, the method 900 progresses to step 910 if the first counter is less than the number of elements in the drop array.

The steps contained in process block 915 classify whether a drop is a huge drop typical of a runtime compilation at a higher level of optimisation. A drop is defined a huge drop if the difference between a first and a second adjacent execution times is such that there is no other execution time between the end of the array and the first execution time that is greater than the first execution time and there is no other execution time between the second execution time and the beginning of the array that has an execution time less than the second execution time. If a huge drop is detected in process block 915 the iteration is marked as comprising a huge drop at step 920.

The method 900 continues until all the drops in the drop array have been classified whereafter the method 900 progresses to step 925. At step 925, the average value of all the drops classified as huge drops is calculated and the method terminates.

Figure 10:
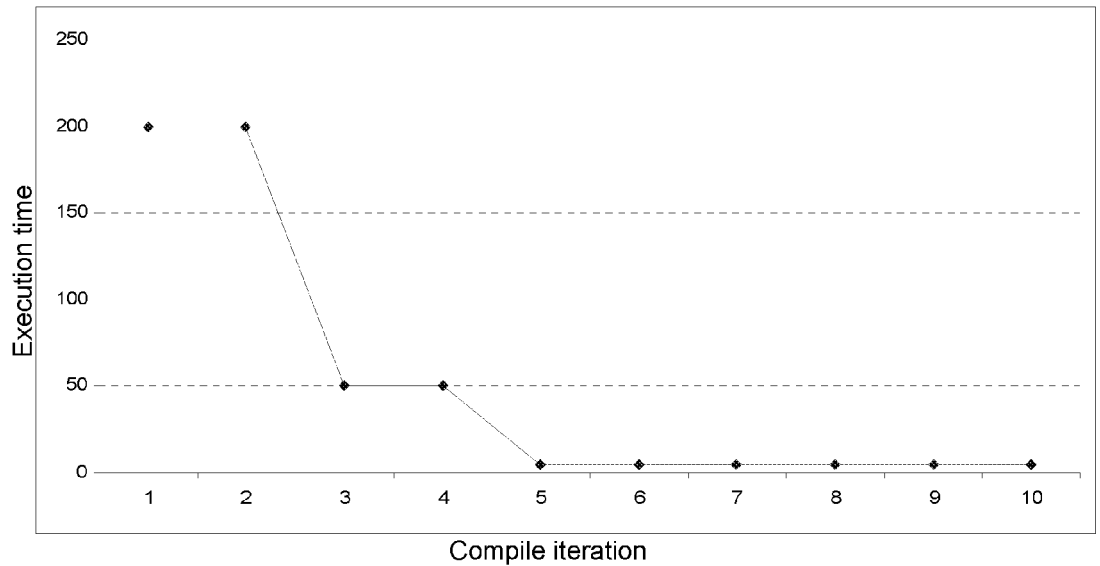
FIG. 10 shows a graphical representation of the execution times according to an embodiment of the invention.

At step 125 of the method 100, the number of compile iterations required for the compiler to achieve maximum output is calculated. For example, FIG. 10 shows several compile iterations where the compiler reaches maximum throughput. The execution time in seconds is shown on the Y axis and the number of iterations is shown on the X axis. In FIG. 10, the compiler reaches a maximum throughput of 5 seconds after 5 iterations.

Figure 11:
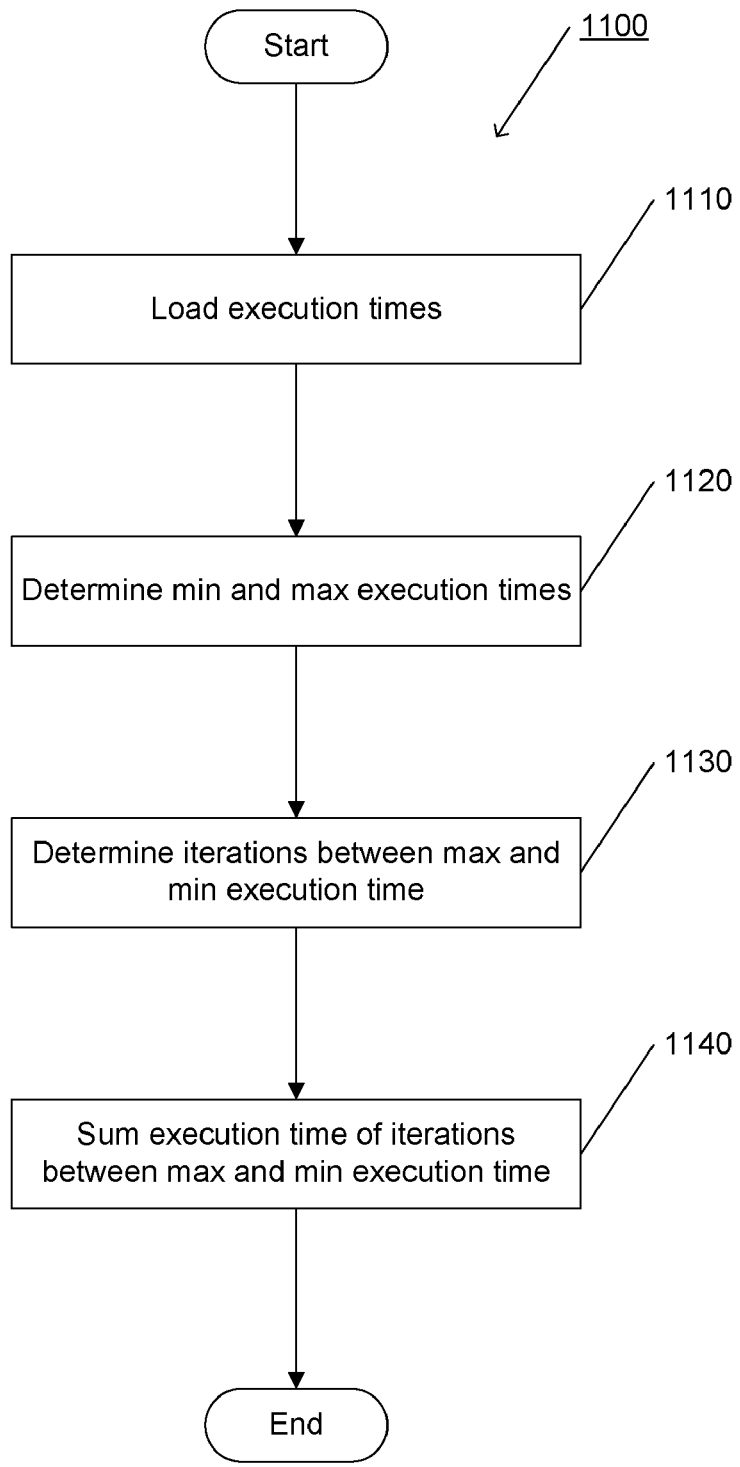
FIG. 11 shows a method for determining the time taken to achieve maximum throughput according to an embodiment of the invention.

FIG. 11 shows the method 1100 used to determine the time taken to achieve maximum throughput. The method 1100 begins at step 1110 where the execution times from the compile iterations are loaded.

At step 1120 the maximum and minimum execution times for the execution times are determined. If there are multiple iterations with maximum or minimum execution times, the first iteration having the minimum execution time and the first iteration having the maximum execution time is used.

At step 1130, the iterations between the maximum execution time and the minimum execution time are determined.

At step 1140, the time taken to achieve the maximum throughput is the sum of the execution times of the iterations determined in step 1130.

At step 130 of method 100, the compiler is assigned an efficiency score S. The efficiency score is calculated as the weighted sum of the overall throughput improvement as determined in method 300, the average improvement of execution time achieved after recompilation at a higher optimization level as determined in method 900 and reciprocal of the time taken to achieve maximum throughput as determined in 1100 as:

$$S = w_1 a + w_2 b + w_3 (1/c)$$

Figure 12A:
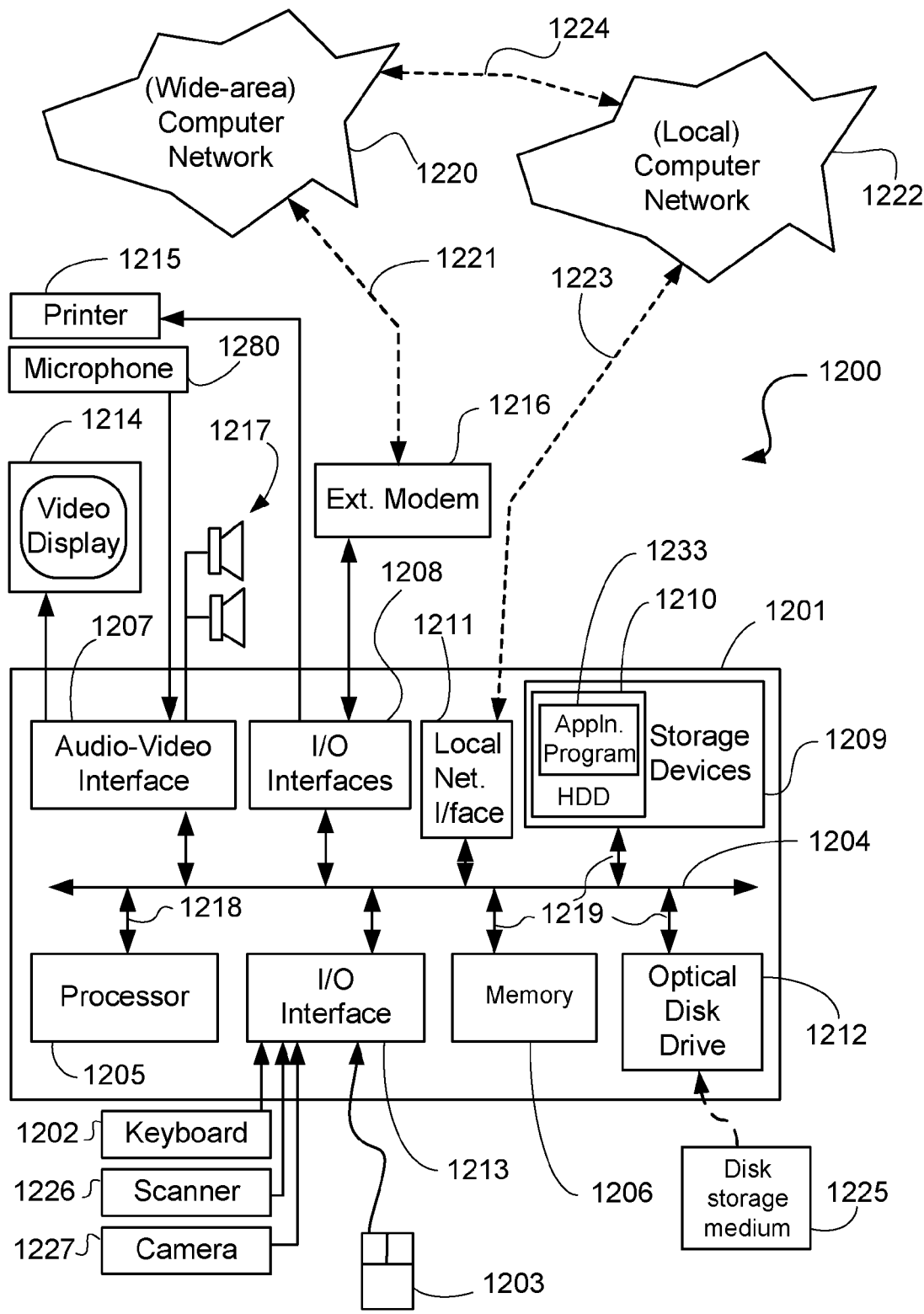
FIGS. 12A and 12B form a schematic block diagram of a general purpose computer system upon which the arrangements described can be practiced according to an embodiment of the invention.
Figure 12B:
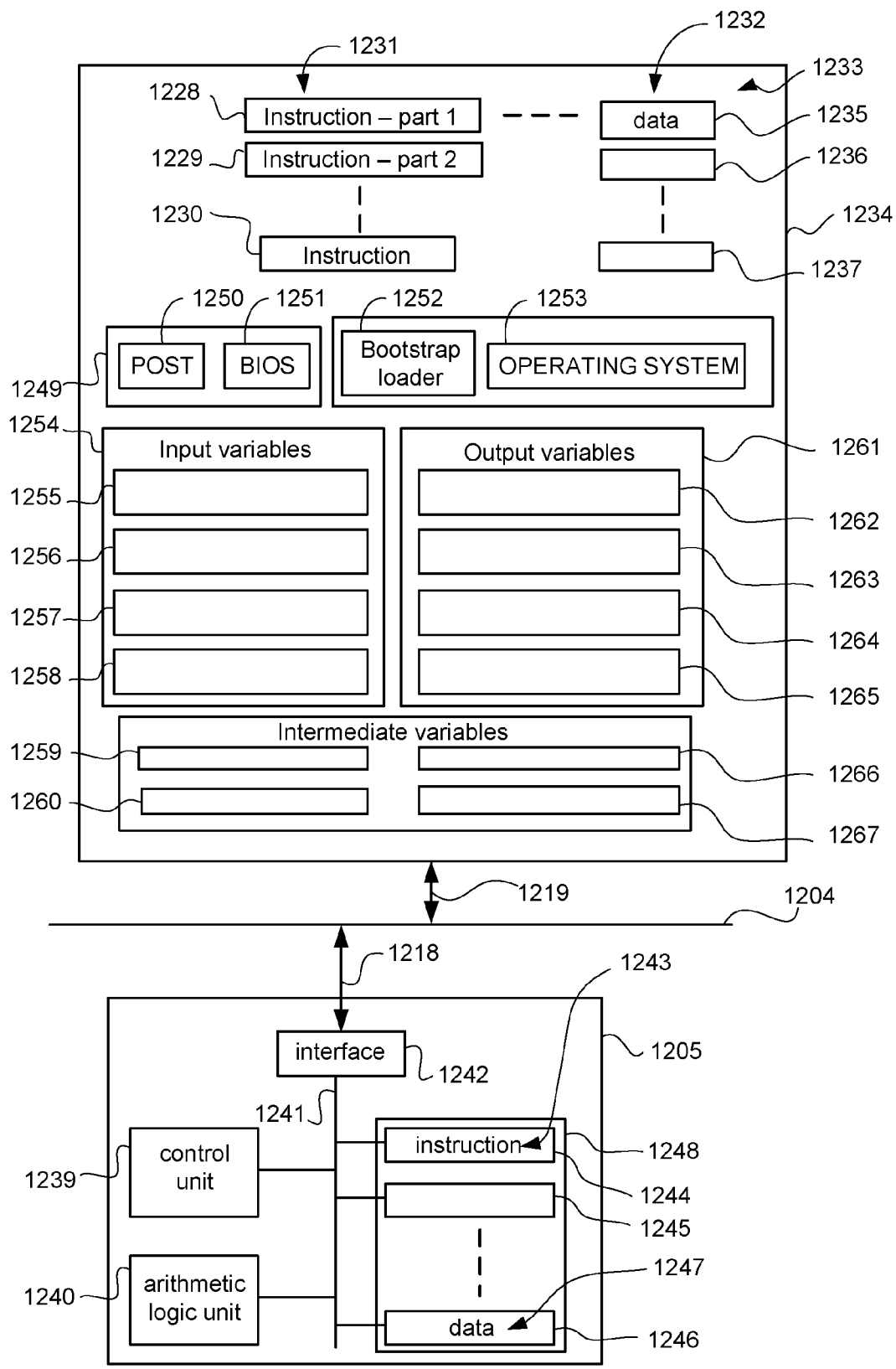

Where:
a=overall throughput improvement
b=average improvement of execution achieved after recompilation at a higher optimization level
c=time taken to achieve maximum throughput Weights w may be chosen such that S equals the mean of the overall throughput improvement, the average improvement of execution time achieved after recompilation at a higher optimization level and the reciprocal of the time taken to achieve maximum throughput FIGS. 12A and 12B collectively form a schematic block diagram of a general purpose computer system 1200, upon which the various arrangements described can be practiced.

As seen in FIG. 12A, the computer system 1200 is formed by a computer module 1201, input devices such as a keyboard 1202, a mouse pointer device 1203, a scanner 1226, a camera 1227, and a microphone 1280, and output devices including a printer 1215, a display device 1214 and loudspeakers 1217. An external Modulator-Demodulator (Modem) transceiver device 1216 may be used by the computer module 1201 for communicating to and from a communications network 1220 via a connection 1221. The network 1220 may be a wide-area network (WAN), such as the Internet or a private WAN. Where the connection 1221 is a telephone line, the modem 1216 may be a traditional "dial-up" modem. Alternatively, where the connection 1221 is a high capacity (eg: cable) connection, the modem 1216 may be a broadband modem. A wireless modem may also be used for wireless connection to the network 1220.

The computer module 1201 typically includes at least one processor unit 1205, and a memory unit 1206 for example formed from semiconductor random access memory (RAM) and semiconductor read only memory (ROM). The module 1201 also includes an number of input/output (I/O) interfaces including an audio-video interface 1207 that couples to the video display 1214, loudspeakers 1217 and microphone 1280, an I/O interface 1213 for the keyboard 1202, mouse 1203, scanner 1226, camera 1227 and optionally a joystick (not illustrated), and an interface 1208 for the external modem 1216 and printer 1215. In some implementations, the modem 1216 may be incorporated within the computer module 1201, for example within the interface 1208. The computer module 1201 also has a local network interface 1211 which, via a connection 1223, permits coupling of the computer system 1200 to a local computer network 1222, known as a Local Area Network (LAN). As also illustrated, the local network 1222 may also couple to the wide network 1220 via a connection 1224, which would typically include a so-called "firewall" device or device of similar functionality. The interface 1211 may be formed by an ethernet circuit card, a wireless arrangement such as an IEEE 802.11 wireless arrangement.

The interfaces 1208 and 1213 may afford either or both of serial and parallel connectivity, the former typically being implemented according to the Universal Serial Bus (USB) standards and having corresponding USB connectors (not illustrated). Storage devices 1209 are provided and typically include a hard disk drive (HDD) 1210. Other storage devices such as a floppy disk drive and a magnetic tape drive (not illustrated) may also be used. An optical disk drive 1212 is typically provided to act as a non-volatile source of data. Portable memory devices, such optical disks (eg: CD-ROM, DVD), USB-RAM, and floppy disks for example may then be used as appropriate sources of data to the system 1200.

The components 1205 to 1213 of the computer module 1201 typically communicate via an interconnected bus 1204 and in a manner which results in a conventional mode of operation of the computer system 1200 known to those in the relevant art.

The method of determining the efficiency of a runtime compiler may be implemented using the computer system 1200 wherein the processes of FIGS. 1, 2, 3, 5, 8, 9 and 11, may be implemented as one or more software application programs 1233 executable within the computer system 1200. In particular, the steps of the method of determining the efficiency of a runtime compiler are effected by instructions 1231 in the software 1233 that are carried out within the computer system 1200. The software instructions 1231 may be formed as one or more code modules, each for performing one or more particular tasks. The software may also be divided into two separate parts, in which a first part and the corresponding code modules performs the determining the efficiency of a runtime compiler methods and a second part and the corresponding code modules manage a user interface between the first part and the user.

The software 1233 is generally loaded into the computer system 1200 from a computer readable medium, and is then typically stored in the HDD 1210, as illustrated in FIG. 12A, or the memory 1206, after which the software 1233 can be executed by the computer system 1200. In some instances, the application programs 1233 may be supplied to the user encoded on one or more CD-ROM 1225 and read via the corresponding drive 1212 prior to storage in the memory 1210 or 1206. Alternatively the software 1233 may be read by the computer system 1200 from the networks 1220 or 1222 or loaded into the computer system 1200 from other computer readable media. Computer readable storage media refers to any storage medium that participates in providing instructions and/or data to the computer system 1200 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 1201. Examples of computer readable transmission media that may also participate in the provision of software, application programs, instructions and/or data to the computer module 1201 include radio or infra-red transmission channels as well as a network connection to another computer or networked device, and the Internet or Intranets including e-mail transmissions and information recorded on Websites and the like.

The second part of the application programs 1233 and the corresponding code modules mentioned above may be executed to implement one or more graphical user interfaces (GUIs) to be rendered or otherwise represented upon the display 1214. Through manipulation of typically the keyboard 1202 and the mouse 1203, a user of the computer system 1200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1217 and user voice commands input via the microphone 1280.

FIG. 12B is a detailed schematic block diagram of the processor 1205 and a "memory" 1234. The memory 1234 represents a logical aggregation of all the memory devices (including the HDD 1210 and semiconductor memory 1206) that can be accessed by the computer module 1201 in FIG. 12A.

When the computer module 1201 is initially powered up, a power-on self-test (POST) program 1250 executes. The POST program 1250 is typically stored in a ROM 1249 of the semiconductor memory 1206. A program permanently stored in a hardware device such as the ROM 1249 is sometimes referred to as firmware. The POST program 1250 examines hardware within the computer module 1201 to ensure proper functioning, and typically checks the processor 1205, the memory (1209, 1206), and a basic input-output systems software (BIOS) module 1251, also typically stored in the ROM 1249, for correct operation. Once the POST program 1250 has run successfully, the BIOS 1251 activates the hard disk drive 1210. Activation of the hard disk drive 1210 causes a bootstrap loader program 1252 that is resident on the hard disk drive 1210 to execute via the processor 1205. This loads an operating system 1253 into the RAM memory 1206 upon which the operating system 1253 commences operation. The operating system 1253 is a system level application, executable by the processor 1205, to fulfil various high level functions, including processor management, memory management, device management, storage management, software application interface, and generic user interface.

The operating system 1253 manages the memory (1209, 1206) in order to ensure that each process or application running on the computer module 1201 has sufficient memory in which to execute without colliding with memory allocated to another process. Furthermore, the different types of memory available in the system 1200 must be used properly so that each process can run effectively. Accordingly, the aggregated memory 1234 is not intended to illustrate how particular segments of memory are allocated (unless otherwise stated), but rather to provide a general view of the memory accessible by the computer system 1200 and how such is used.

The processor 1205 includes a number of functional modules including a control unit 1239, an arithmetic logic unit (ALU) 1240, and a local or internal memory 1248, sometimes called a cache memory. The cache memory 1248 typically includes a number of storage registers 1244-1246 in a register section. One or more internal buses 1241 functionally interconnect these functional modules. The processor 1205 typically also has one or more interfaces 1242 for communicating with external devices via the system bus 1204, using a connection 1218.

The application program 1233 includes a sequence of instructions 1231 that may include conditional branch and loop instructions. The program 1233 may also include data 1232 which is used in execution of the program 1233. The instructions 1231 and the data 1232 are stored in memory locations 1228-1230 and 1235-1237 respectively. Depending upon the relative size of the instructions 1231 and the memory locations 1228-1230, a particular instruction may be stored in a single memory location as depicted by the instruction shown in the memory location 1230. Alternately, an instruction may be segmented into a number of parts each of which is stored in a separate memory location, as depicted by the instruction segments shown in the memory locations 1228-1229.

In general, the processor 1205 is given a set of instructions which are executed therein. The processor 1205 then waits for a subsequent input, to which it reacts to by executing another set of instructions. Each input may be provided from one or more of a number of sources, including data generated by one or more of the input devices 1202, 1203, data received from an external source across one of the networks 1220, 1222, data retrieved from one of the storage devices 1206, 1209 or data retrieved from a storage medium 1225 inserted into the corresponding reader 1212. The execution of a set of the instructions may in some cases result in output of data. Execution may also involve storing data or variables to the memory 1234.

The disclosed determining compiler efficiency arrangements use input variables 1254, that are stored in the memory 1234 in corresponding memory locations 1255-1258. The determining compiler efficiency arrangements produce output variables 1261, that are stored in the memory 1234 in corresponding memory locations 1262-1265. Intermediate variables may be stored in memory locations 1259, 1260, 1266 and 1267.

The register section 1244-1246, the arithmetic logic unit (ALU) 1240, and the control unit 1239 of the processor 1205 work together to perform sequences of micro-operations needed to perform "fetch, decode, and execute" cycles for every instruction in the instruction set making up the program 1233. Each fetch, decode, and execute cycle comprises:
  (a) a fetch operation, which fetches or reads an instruction 1231 from a memory location 1228;
  (b) a decode operation in which the control unit 1239 determines which instruction has been fetched; and
  (c) an execute operation in which the control unit 1239 and/or the ALU 1240 execute the instruction.

Thereafter, a further fetch, decode, and execute cycle for the next instruction may be executed. Similarly, a store cycle may be performed by which the control unit 1239 stores or writes a value to a memory location 1232.

Each step or sub-process in the processes of determining compiler efficiency is associated with one or more segments of the program 1233, and is performed by the register section 1244-1247, the ALU 1240, and the control unit 1239 in the processor 1205 working together to perform the fetch, decode, and execute cycles for every instruction in the instruction set for the noted segments of the program 1233.

The method of determining compiler efficiency may alternatively be implemented in dedicated hardware such as one or more integrated circuits performing the functions or sub functions. Such dedicated hardware may include graphic processors, digital signal processors, or one or more microprocessors and associated memories.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing describes only some embodiments of the present invention, and modifications and/or changes can be made thereto without departing from the scope and spirit of the invention, the embodiments being illustrative and not restrictive.

APPENDIX 1

```
boolean isHugeSpikePresent (long arrayOfExecutionTimes[ ]) }
long deltaFromMinimumPeak = 0;
boolean spike = false;
long minimumPeak = arrayOfExecutionTimes[0];
// Start from 1 and go till N.
for each iteration i from 1 to N-1 {
        if ( arrayOfExecutionTimes[i] < minimumPeak) {
// We have a new minimum peak. Mark the same.
minimumPeak = arrayOfExecutionTimes[i];
deltaFromMimumPeak = 0;
}
else if (arrayOfExecutionTimes[i] > minimumPeak) {
// Check the difference between execution time of current iteration
// and the minimumPeak. We can then compare if the execution times
// have increased beyond acceptable limits.
deltaFromMinimumPeak = arrayOfExecutionTimes[i]- minimumPeak;
if (!isDeltaAcceptable (deltaFromMinimumPeak, minimumPeak) {
// This shows that there is a huge spike. Verification failed.
// Set the return value appropriately.
spike = true;
break;
}
}// else if ends here
}// for loop ends here
return spike;
}// isHugeSpikePresent( ) function ends here
```

APPENDIX 2

```
boolean isDeltaAcceptable (long deltaFromMinimumPeak, long
minimumPeak) {
    boolean rc = true, rcl = true;
// Point #1 implemented below:
if ( deltaFromMinimumPeak > getClockLatencyTime( ) ) {
        rc = false;
}
// Point #2 implemented below:
deltaPercent = ( deltaFromMinimumPeak / minimumPeak ) * 100;
if ( deltaPercent > getUserInputAcceptableSpike( ) ) {
        rcl = false;
}
// Check if any of #1 or #2 have failed.
if ( !rc || !rcl ) {
        return false;
} else {
        return true;
}
} // isDeltaAcceptable ends here
long getClockLatencyTime( )
{
  array latencies = new array;
  for i=0 to i=maxIterations
  {
    latencies.Add(getCurrentTime( )-getCurrentTime( ));
  }
  return Average(latencies);
}
```

APPENDIX 3

```
double computeAvgHugeDrop ( long arrayOfExecutionTimes[ ]) {
int count = 0;
// Find all the drops
for ( int i = 0; i < arrayOfExecutionTimes.length; i++) {
if ( arrayOfExecutionTimes[i] > arrayOfExecutionTimes [i+1]) {
/*
 * This is a drop. Store this in the The format used to store the
entries in the
 * array is -
 *
 * (startIteration, clockedExecTime, endIteration,
clockedExecTime).
 *
 *
 */
store (i, arrayOfExecutionTimes[i], i+1, arrayOfExecutionTimes[i+1]);
count++;
{
{
// Declare a boolean to suggest if it is required to check the other
side of the drop.
boolean moveOn = false;
// Now, find all the "huge" drops.
for (int i = 0; i < count; i++) {
dropEntry = getDropEntry(i);
// Traverse from startIteration in dropEntry to end of the
arrayOfExecutionTimes array
for (int j = dropEntry.startIteration + 1; j <
arrayOfExecutionTimes.length; j++) {
if ( arrayOfExecutionTimes[dropEntry.startIteration] <
arrayOfExecutionTimes[j]) {
moveOn = true;
break;
}
}
// Traverse from endIteration in dropEntry to start of the
arrayOfExecutionTimes array
for (int k = dropEntry.endIteration - 1; k >= 0; k--) {
if ( arrayOfExecutionTimes[dropEntry.endIteration >
arrayOfExecutionTimes[k]) {
moveOn = true;
break;
}
}
// If "huge drop" definition does not satisfy, move on to the next
drop. If not, mark
// this drop as a huge drop.
if (moveOn) {
continue;
} else {
markDropAsHugeDrop (dropEntry);
}
}
// Find the avg "huge drop".
double hugeDropAmount = 0;
for (int x = 0; x < count; x++) {
if ( isHugeDrop (dropEntry) ) {
hugeDropAmount+ = arrayOfExecutionTimes[dropEntry.startIteration] -
arrayOfExecutionTimes[dropEntry.endIteration];
}
}
return ( hugeDropAmount / count);
}
```

The invention claimed is:

1. A computer implemented method, executed by a processor, for determining the efficiency of a runtime compiler comprising:

recording a set of execution times representing the time taken for program code to perform a set task after two or more runtime compilations, calculating a first metric as the difference between the first execution time and the last execution time of said set of execution times, calculating a second metric as the average throughput improvement from said set of execution times, calculating a third metric as the time taken for said runtime compiler to achieve the maximum throughput from said set of execution times, calculating an efficiency metric using said first, second, and third metrics to determine the efficiency of said runtime compiler, wherein said efficiency metric is the weighted sum of said first metric, said second metric, and the reciprocal of said third metric, and classifying said runtime compiler as acceptable or unacceptable, wherein said runtime compiler is classified as unacceptable if a criterion is satisfied.

2. The computer implemented method of claim 1, wherein said criterion is satisfied if said first metric is negative.

3. The computer implemented method of claim 1, wherein said criterion is satisfied if any of execution times of said set of execution times is less than a subsequent execution time of said set of execution times.

4. The computer implemented method of claim 3, wherein said criterion is satisfied if the difference between any of execution times of said set of execution times is less than a subsequent execution time of said set of execution times is greater than a user specified limit.

5. The computer implemented method of claim 4, wherein said user specified limit is specified as a percentage.

6. The computer implemented method of claim 1, wherein said efficiency metric is the mean of said first metric, said second metric, and the reciprocal of said third metric.

7. The computer implemented method of claim 1, further comprising:
classifying throughput improvements as large or small, wherein said second metric is calculated only for said throughput improvements classified as large.

8. The computer implemented method of claim 7, wherein a throughput improvement is classified as large if said runtime compiler performs a runtime compilation at a higher compiler optimisation level.

9. A system for determining the efficiency of a runtime compiler comprising:
a processor, and
a storage device, wherein
said storage device records a set of execution times representing the time taken for program code to perform a set task after two or more runtime compilations,
said processor calculates a first metric as the difference between the first execution time and the last execution time of said set of execution times,
said processor calculates a second metric as the average throughput improvement from said set of execution times,
said processor calculates a third metric as the time taken for said runtime compiler to achieve the maximum throughput from said set of execution times,
said processor calculates an efficiency metric using said first, second, and third metrics to determine the efficiency of said runtime compiler, wherein said efficiency metric is the weighted sum of said first metric, said second metric, and the reciprocal of said third metric, and said processor classifies said runtime compiler as acceptable or unacceptable, wherein said runtime compiler is classified as unacceptable if a criterion is satisfied.

10. The system of claim 9, wherein said criterion is satisfied if said first metric is negative.

11. The system of claim 9, wherein said criterion is satisfied if any of execution times of said set of execution times is less than a subsequent execution time of said set of execution times.

12. The system of claim 11, wherein said criterion is satisfied if the difference between any of execution times of said set of execution times is less than a subsequent execution time of said set of execution times is greater than a user specified limit.

13. The system of claim 12, wherein said user specified limit is specified as a percentage.

14. The system of claim 9, wherein said efficiency metric is the mean of said first metric, said second metric, and the reciprocal of said third metric.

15. The system of claim 9, further comprising:
said processor classifying throughput improvements as large or small, wherein said second metric is calculated only for said throughput improvements classified as large.

16. The system of claim 15, wherein a throughput improvement is classified as large if said runtime compiler performs a runtime compilation at a higher compiler optimisation level.

* * * * *